United States Patent
Nasielski et al.

(10) Patent No.: US 7,983,242 B2
(45) Date of Patent: Jul. 19, 2011

(54) PACKET DATA SERVICE WITH CIRCUIT-SWITCHED CALL NOTIFICATION

(75) Inventors: John Wallace Nasielski, San Diego, CA (US); Raymond Tah-Sheng Hsu, San Diego, CA (US); Arungundram C. Mahendran, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1431 days.

(21) Appl. No.: 10/643,604

(22) Filed: Aug. 18, 2003

(65) Prior Publication Data

US 2005/0041640 A1    Feb. 24, 2005

(51) Int. Cl.
*H04L 12/66* (2006.01)

(52) U.S. Cl. ........ 370/352; 370/259; 370/353; 370/354; 370/355; 370/356; 379/215.01; 455/414.1

(58) Field of Classification Search ................... 370/259, 370/352, 353, 354, 355, 356, 357; 455/414.1; 379/215.01
See application file for complete search history.

(56) References Cited

U.S. PATENT DOCUMENTS

| | | | | |
|---|---|---|---|---|
| 5,742,905 A | * | 4/1998 | Pepe et al. | 455/461 |
| 5,805,587 A | * | 9/1998 | Norris et al. | 370/352 |
| 5,974,044 A | | 10/1999 | Ikeda et al. | |
| 7,142,857 B1 | | 11/2006 | Calabrese et al. | |
| 2001/0004593 A1 | | 6/2001 | Holmes et al. | |
| 2002/0080770 A1 | * | 6/2002 | Hall et al. | 370/352 |
| 2002/0082029 A1 | | 6/2002 | Ahmad et al. | 455/458 |
| 2003/0091030 A1 | | 5/2003 | Yegin et al. | |
| 2004/0136505 A1 | * | 7/2004 | Garg et al. | 379/88.12 |
| 2005/0094779 A1 | * | 5/2005 | Kleinfelter et al. | 379/88.12 |

FOREIGN PATENT DOCUMENTS

| | | |
|---|---|---|
| EP | 0851703 A2 | 7/1998 |
| JP | 10304455 | 11/1998 |
| JP | 11225165 | 8/1999 |
| WO | 9726764 | 7/1997 |
| WO | WO9956478 A1 | 11/1999 |

OTHER PUBLICATIONS

International Search Report and Written Opinion—PCT/US2004/025150, International Search Authority—European Patent Office—Mar. 4, 2005 (030277).

* cited by examiner

*Primary Examiner* — Quynh H Nguyen
(74) *Attorney, Agent, or Firm* — Kristine U. Ekwueme (57) ABSTRACT

Systems and techniques are disclosed relating to wireless communications. The systems and techniques involve wireless communications wherein a packet data session may be established between a wireless communications device and a packet data serving node to support a network connection to a packet-switched network. The wireless communications device may be configured to receive a notification of an incoming call from a circuit-switched network even when the network connection is active.

28 Claims, 4 Drawing Sheets

PACKET DATA SERVICE WITH CIRCUIT-SWITCHED CALL NOTIFICATION

BACKGROUND

1. Field

The present disclosure relates generally to wireless communications, and more specifically, to various systems and techniques for implementing packet data services with switched-circuit call notification.

2. Background

Modern communication systems are designed to allow multiple users to share a common communications medium. One such communications system is a code division multiple access (CDMA) system. CDMA is a modulation and multiple access scheme based on spread-spectrum communications. In a CDMA communications system, a large number of signals shares the same frequency spectrum and, as a result, provides an increase in user capacity. This is achieved by transmitting each signal with a different code that modulates a carrier, and thereby, spreads the signal over the entire spectrum. The transmitted signals can be separated in the receiver by a correlator using a corresponding code to de-spread the desired signal. The undesired signals, whose codes do not match, contribute only to noise.

CDMA modulation techniques have been standardized to facilitate interoperation between equipment manufacturers. By way of example, voice service using CDMA technology has been standardized in the United States in Telecommunications Industry Association TIA/EIA/IS-95-B, entitled "Mobile Station-Base Station Compatibility Standard for Dual-Mode Wideband Spread Spectrum Cellular Systems," and referred to herein as "IS-95." The IS-95 standard was originally optimized for transmission of voice over a circuit-switched network. Subsequent standards have built on the IS-95 standard to support a variety of additional non-voice services including packet data services. One such set of service options has been standardized in the United States in Telecommunications Industry Association TIA/EIA/IS-707-A, entitled "Data Service Options for Spread Spectrum Systems," and referred to herein as "IS-707." The IS-707 standard describes techniques for sending Internet Protocol (IP) packets through an IS-95 wireless network.

A CDMA standard supporting both voice and packet data services has been standardized in the United States in Telecommunications Industry Association (TIA), entitled "Upper Layer (Layer 3) Signaling Standard for cdma2000 Spread Spectrum Systems, Release A—Addendum 1," dated Oct. 27, 2000, and referred to herein as "cdma2000." The initial release of cdma2000, however, did not provide for simultaneous use of both voice and packet data services. Consequently, a wireless communications device designed for this standard may not be able to receive an incoming circuit-switched call while supporting packet data services. This may be very undesirable in view of the fact that most voice calls today are circuit-switched. Many users would prefer to be notified of an incoming voice call so that they can decide whether to suspend packet data services and take the call. Alternatively, some users may prefer that the communications device itself be configured to automatically suspend packet data services in favor of an incoming voice call. In any event, there is a need in the art for an innovative approach to notify a wireless communications device of an incoming circuit-switched call while supporting packet data services in cdma2000 wireless devices. This approach should not be limited to this standard, but should be a broad-based solution applicable to wireless devices supporting various other communications standards.

SUMMARY

In one aspect of the present invention, a method of wireless communications includes establishing a packet data session from a wireless communications device to support a network connection to a packet-switched network, and receiving a notification at the wireless communications device of an incoming call from a circuit-switched network while the network connection is active.

In another aspect of the present invention, a wireless communications device includes a processor configured to establish a packet data session to support a network connection to a packet-switched network, and receive a notification of an incoming call from a circuit-switched network while the network connection is active.

In yet another aspect of the present invention, a wireless communications device includes means for establishing a packet data session to support a network connection to a packet-switched network, and means for receiving a notification of an incoming call from a circuit-switched network while the network connection is active.

In a further aspect of the present invention, a method of wireless communications includes establishing a packet data session between a wireless communications device and a packet data serving node to support a network connection with a packet-switched network, and routing a notification of an incoming circuit-switched call from a voice message server to the wireless communications device while the network connection is active.

In yet a further aspect of the present invention, a method of communications includes operating a wireless communications device in a serving network, the wireless communications device being assigned to a home network different from the serving network, establishing a packet data session between the wireless communications device and a packet data serving node in the serving network to support a network connection with a packet-switched network, and routing a notification of an incoming circuit-switched call from a voice message server in the home network to the wireless communications device while the network connection is active.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention. In addition, for the purposes of this disclosure, the term "connected" can mean either a direct connection or, where appropriate in the context, an indirect connection, e.g., through intervening or intermediary devices or other means.

In the following detailed description, various aspects of the present invention will be described in the context of a CDMA wireless communications device supporting the cdma2000 standard. While these inventive aspects may be well suited for use with this application, those skilled in the art will readily appreciate that these inventive aspects are likewise applicable for use in devices supporting various other standards. Accordingly, any reference to a CDMA communications device in general, and the cdma2000 standard in particular, are intended only to illustrate the inventive aspects, with the understanding that such inventive aspects have a wide range of applications.

Figure 1:
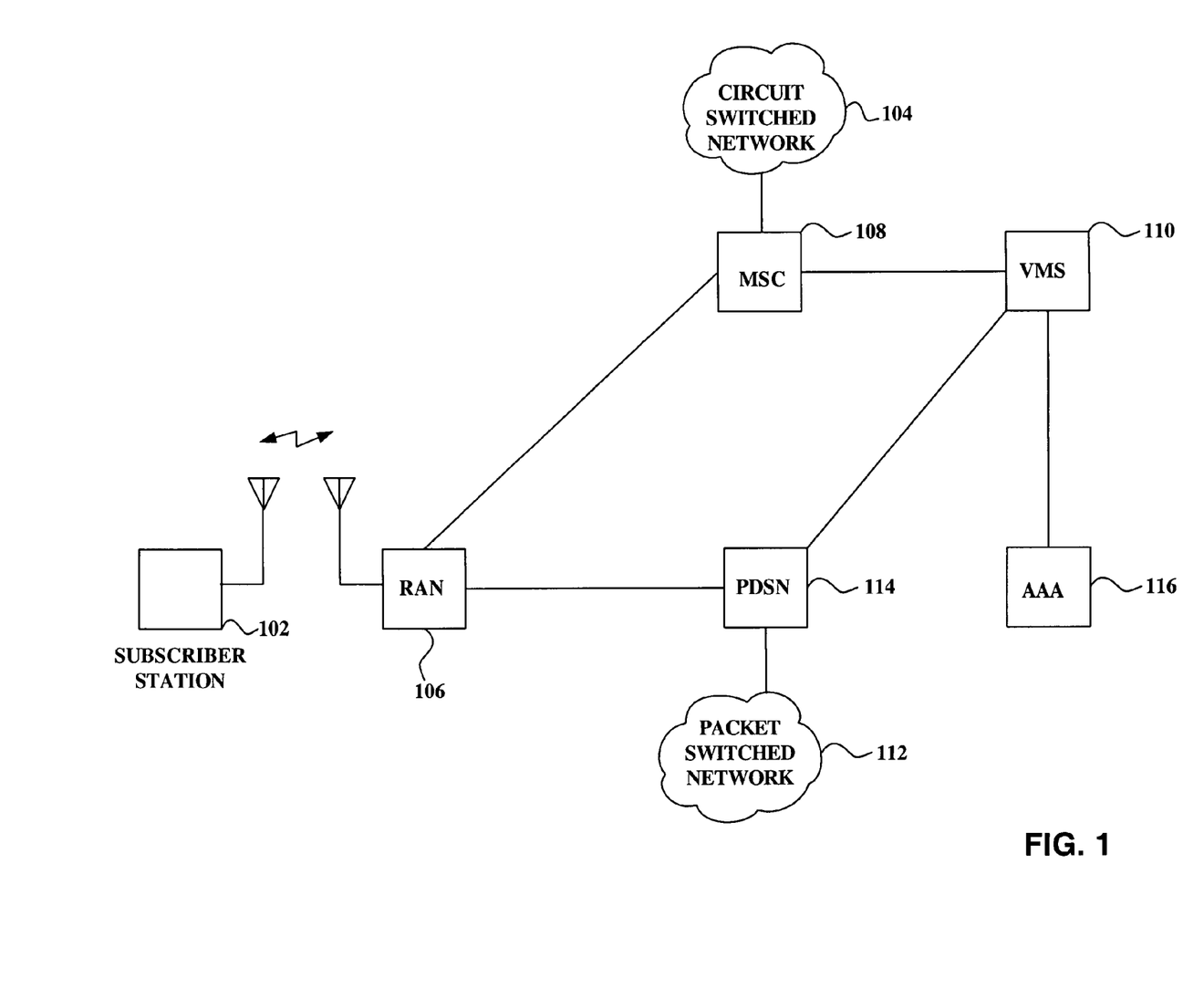
FIG. 1 is a conceptual block diagram illustrating an example of a wireless communications system.

FIG. 1 is a conceptual block diagram of an IS-95 wireless communications system configured to support both circuit-switched and packet-switched applications. In the embodiment shown in FIG. 1, a wireless communications device 102 may access a circuit-switched network 104 through a radio access network (RAN) 106. The circuit-switched network 104 may be a public switched telephone network (PSTN), or any other circuit-switched network. The wireless communications device 102 may be any number of user devices that can communicate over a wireless medium including, but not limited to, a cellular phone, a personal data assistant (PDA), a modem, or any other similar device. In the context of a CDMA communications system, a wireless communications device is often referred to as a "subscriber station," however, the use of this term in the following description is not intended to limit the scope of this device in any way.

The RAN 106 may be implemented with any number of base stations (not shown) dispersed throughout a geographic region. The geographic region may be subdivided into smaller regions known as cells with each base station serving a cell. A base station controller (BSC) (not shown) may be used to coordinate the activities of multiple base stations. The geographic reach of the RAN 106 may be extended by connecting multiple BSCs to a mobile switching center (MSC) 108, with each BSC supporting any number of base stations.

A voice message server (VMS) 110 may be used to support various voice services such as voice mail, but may also provide other data storage capability such as might be needed to store an incoming facsimile. The data storage may be partitioned into separate mailboxes with each mailbox designated to an individual subscriber station. The mailbox may be used to store user files, such as user information and outgoing message files, and also store voice and other data messages received from various callers when the intended subscriber station is unavailable to take the call.

A remote network node (not shown), such as a personal or laptop computer connected to the subscriber station 102 may access a packet-switched network 112 through the RAN 106. Alternatively, the remote network node may be integrated into the subscriber station 102 such as the case might be with a web browser. Each BSC (not shown) within the RAN 106 may communicate with a packet data serving node (PDSN) 114 external to the RAN 106. Although the term "PDSN" may have a special meaning within the context of any CDMA standard, for the purposes of this disclosure the term "PDSN" is intended to include any entity capable of creating, maintaining and terminating a network connection between the subscriber station 102 and the packet-switched network 112.

The subscriber station 102 may access the packet-switched network 112 by first establishing an air link with the RAN 106. Once the air link is established, a logical resource connection may be established between the RAN 106 and the PDSN 114. A data link may then be set up between the subscriber station 102 and the PDSN 114 in accordance with a link layer point-to-point protocol (PPP), which is well known in the art. Next, the PPP link layer protocol may be used to negotiate an Internet Protocol (IP) address to assign to the subscriber station 102. Once an IP address is assigned, the subscriber station 102 may communicate with the packet-switched network 112 over a network connection.

In many packet-switched applications, including cdma2000, a network connection remains in tact whether or not it is being used to support communications. By way of example, the subscriber station 102 may access the packet-switched network 112 to download a web page. A period of inactivity over the network connection may exist after the web page is downloaded while the user reads the contents. During such periods of inactivity, the air link between the subscriber station 102 and the RAN 106 108 may be torn down to preserve valuable wireless resources. However, the IP address and the PPP state may be maintained to reduce the latency of the network when communications resume. The network connection that exists between the subscriber station 102 and the PDSN 114 in the absence of an air link is referred to as a "dormant" connection. When network communications are ready to resume, an "active" network connection may be established with a new air link between the subscriber station 102 and the RAN 106. A "packet data session," where the IP address and the PPP state are maintained, may extend over several periods of dormancy.

When the subscriber station 102 initially establishes a network connection, it may use the existing packet data session with the PDSN 114 to register with the VMS 110 to enable circuit-switched calls. The subscriber station 102 may be pre-configured with either the IP address or the Fully-Qualified Domain Name (FQDN) for the VMS 110. In the case of the FQDN, the subscriber station 102 may query the VMS 110 to obtain its IP address. Either way, once the IP address for the VMS 110 is known, the subscriber station 102 may transmit a registration request to the RAN 106 using a reverse link control channel. The reverse link refers to wireless transmissions from the subscriber station 102 to the RAN 106, and a forward link refers to wireless transmissions from the RAN 106 to the subscriber station 102. The RAN 106 may forward the registration request to the PDSN 114. Using the VMS's IP address contained in the registration request, the PDSN 114 may then deliver the request to the VMS 110. The registration request may include various information including the IP address for the subscriber station 102.

The VMS 110 may attempt to authenticate the registration request using an independent source, such as an Authentication, Authorization, and Accounting (AAA) center 116. This may be achieved in any number of ways. By way of example, the registration request may include a credential for the subscriber station 102 computed from shared secret data (SSD) with the AAA center 116. The VMS 110 may consult the AAA center 116 to authenticate the subscriber station's credential. Alternatively, the VMS 110 may send a challenge to the subscriber station 102 in response to the registration request. In response to the challenge, the subscriber station 102 may send a challenge response back to the VMS 110. The VMS 110 may then consult the AAA center 116 to authenticate the challenge response. Assuming the AAA center 116 can authenticate the subscriber station 102, the AAA center 116 may then access internally stored user profile and Quality of Service (QoS) information to authorize registration.

If the AAA center 116 authorizes registration, the subscriber station 102 and the VMS 110 may establish a transport control protocol (TCP) session that allows reliable delivery of registration messages as well as subsequent communications. These registration messages and subsequent communications may be also be encrypted by means well known in the art. By way of example, both the AAA center 116 and the subscriber station 102 may generate a master session key from the challenge response and the SSD. The AAA center 116 may provide the master session key to the VMS 110 along with an authorization message to register the subscriber station 102. The VMS 110 may then compute a session key based on the master session key and a locally generated random number. Using the packet data session between the subscriber station 102, the PDSN 114, the VMS 110 may send the subscriber station 102 a registration acknowledgement containing the random number. When the subscriber station 102 receives the registration acknowledgement, it may generate the same session key from the master session key and the random number in the registration acknowledgement.

The session key may be refreshed periodically by sending a new registration request from the subscriber station 102 to the VMS 110 using the packet data session between the subscriber station 102 and the PDSN 114. This request may be used by the VMS 110 to trigger the generation of a new session key from the master session key and a new random number. The VMS 110 may send a new registration acknowledgement containing the random number back to the subscriber station 102 via the packet data session. The subscriber station 102 may use the new registration acknowledgement to compute the new session key.

Once the registration process is complete, the subscriber station 102 may be able to receive an incoming circuit-switched call during a packet data session with an active network connection. When an incoming circuit-switched call is delivered to the MSC 108, the MSC 108 may direct the appropriate BSC in the RAN 106 to page the subscriber station 102. A packet control function (PCF) integrated into the BSC may be used to determine whether the network connection is dormant. During periods of dormancy, the PCF may be used to buffer data packets from the PDSN 114 until the air link between the RAN 106 and the subscriber station 102 is re-established. In the event that the network connection is active, the BSC may route a busy signal to the MSC 108 indicating that the subscriber station 110 is unavailable to take the call.

In response to the busy signal, the MSC 108 may forward a busy signal indication to the VMS 110 along with the telephone number of the intended subscriber station 102. The VMS 110 may then check the telephone number to see if it is registered to receive circuit-switched calls during packet data sessions. If the telephone number is not registered, then the VMS 110 may handle the call in the conventional fashion. By way of example, if the circuit-switched call is a voice call, the VMS 110 may retrieve a greeting from the mailbox of the intended subscriber station 102 and route it through the MSC 108 to the caller over the circuit-switched network 104. The greeting may be used to direct the caller to leave a voice message for the unanswered call. If the caller decides to leave a voice message, that message may be routed back through the MSC 108 to the VMS 110 and recorded in the mailbox of the intended subscriber station 102.

Conversely, if the telephone number is registered, the VMS 110 may notify the subscriber station 102 of the circuit-switch call. The notification may be encrypted with the session key by the VMS 110 and sent to the subscriber station 102 via the TCP session established during registration. The IP address of the subscriber station 102 may be appended to the notification by the VMS 110 so that the PDSN 114 can route the notification to the intended subscriber station 102 using the existing packet data session.

The subscriber station 102 may have a vibrator or a ringer circuit (not shown) responsive to the circuit-switched call notification. The notification may include caller information which may be presented to a display (not shown) on the subscriber station 102. The user may look to the displayed information to determine whether to accept the incoming call. Alternatively, the subscriber station 102 may be preprogrammed to accept all incoming circuit-switched calls. Either way, the subscriber station 102 may send a reply, encrypted with the session key, to the VMS 110 over the TCP session. This may be achieved by appending the VMS's IP address to the reply and transmitting it to the PDSN 114 using the packet data session. Using the appended IP address, the PDSN 114 may route the reply to the VMS 110.

The reply generated by the subscriber station 102 and sent to the VMS 110 may indicate whether the user accepts or rejects the incoming call. If the user rejects the incoming call, then the VMS 110 may handle the call in the usual manner in response to the reply. If, on the other hand, the user accepts the incoming call, a call-delivery signal may be sent from the VMS 110 to the MSC 108 in response to the reply. The PPP session between the subscriber station 102 and the PDSN 114 may be released and a logical resource connection between the RAN 106 and the MSC 118 established to support the call. The MSC 108 may then page the subscriber station 102 triggering an exchange of signaling messages to support call set-up. Once the call is set up, the user on the subscriber station 102 may be able to communicate with the caller over the circuit-switched network 104.

Figure 2:
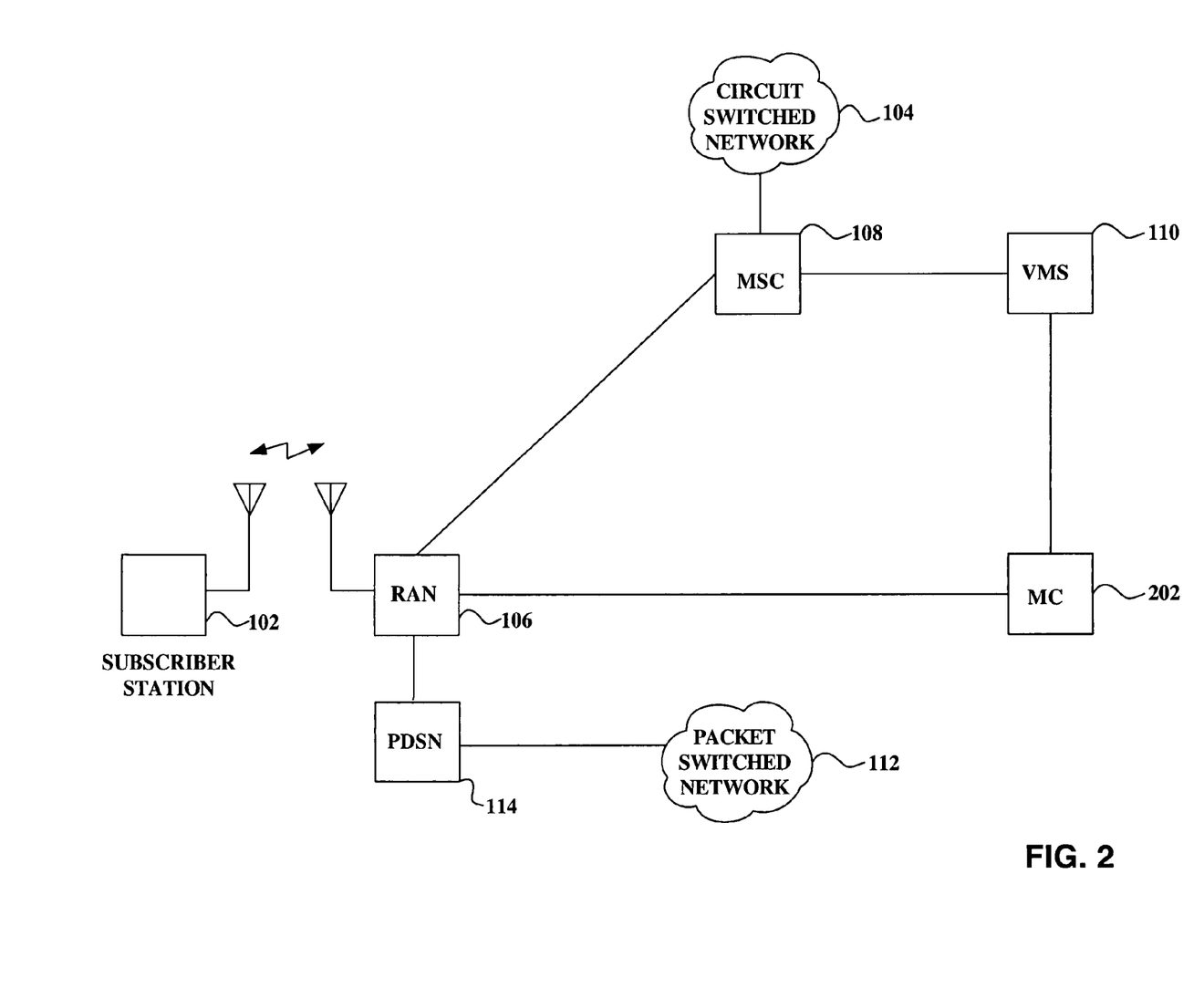
FIG. 2 is a conceptual block diagram illustrating an example of a wireless communication systems with Short Message Service (SMS) capability.

In an alternative embodiment of a wireless communications system, Short Message Service (SMS) may be used to enable circuit-switched calls during packet data sessions with an active network connection. SMS is a well known service that allows subscriber stations to send and receive short text messages. FIG. 2 is a conceptual block diagram of an IS-95 wireless communications system utilizing SMS. In this system, the VMS 110 may notify the subscriber station 102 of an incoming circuit-switched call using SMS messages, thus eliminating the need to register the subscriber station 102 with the VMS 110.

When an incoming call from the circuit-switched network 104 arrives at the MSC 108, the MSC 108 may direct the appropriate BSC in the RAN 106 to page the subscriber station 102. In the event that the subscriber station 102 has an active network connection, the BSC may send a busy signal to the MSC 108 indicating that the subscriber station 110 is unavailable to take the call.

In response to the busy signal, the MSC 108 may send a busy signal indication to the VMS 110 along with the subscriber station's telephone number. The telephone number may be used by the VMS 110 to access a database (not shown) containing the SMS profile for the subscriber station 102. If the SMS profile indicates that circuit-switched calls are enabled during packet data sessions for the subscriber station 102, the VMS 110 may send to the subscriber station 102 a SMS message that contains a notification of the incoming call along with caller identifier information. The SMS message may be sent to the subscriber station 102 through a message center (MC) 202. If, on the other hand, the SMS profile indicates that the subscriber station 102 is unable to accept circuit-switched calls during packet data sessions, the VMS 110 may direct the incoming call to the appropriate user mailbox.

As discussed in greater detail earlier, the caller information may be presented to the display (not shown) on the subscriber station 102 so that the user can determine whether to accept the incoming call. Alternatively, the subscriber station 102 may be preprogrammed to accept all incoming circuit-switched calls. Either way, the subscriber station 102 may be configured to send to the VMS 110 a SMS message containing a reply indicating whether the user accepts or rejects the call.

If the user rejects the incoming call, then the VMS 110 may handle the call in the usual manner in response to the reply. If, on the other hand, the user accepts the incoming voice call, a call-delivery signal may be sent from the VMS 110 to the MSC 108. The PPP session between the subscriber station 102 and the PDSN 114 may be released and a logical resource connection between the RAN 106 and the MSC 118 may be established to support the call. The MSC 108 may then page the subscriber station 102 triggering an exchange of signaling messages to support call set-up. Once the call is set up, the user on the subscriber station 102 may be able to communicate with a caller over the circuit-switched network 104.

Figure 3:
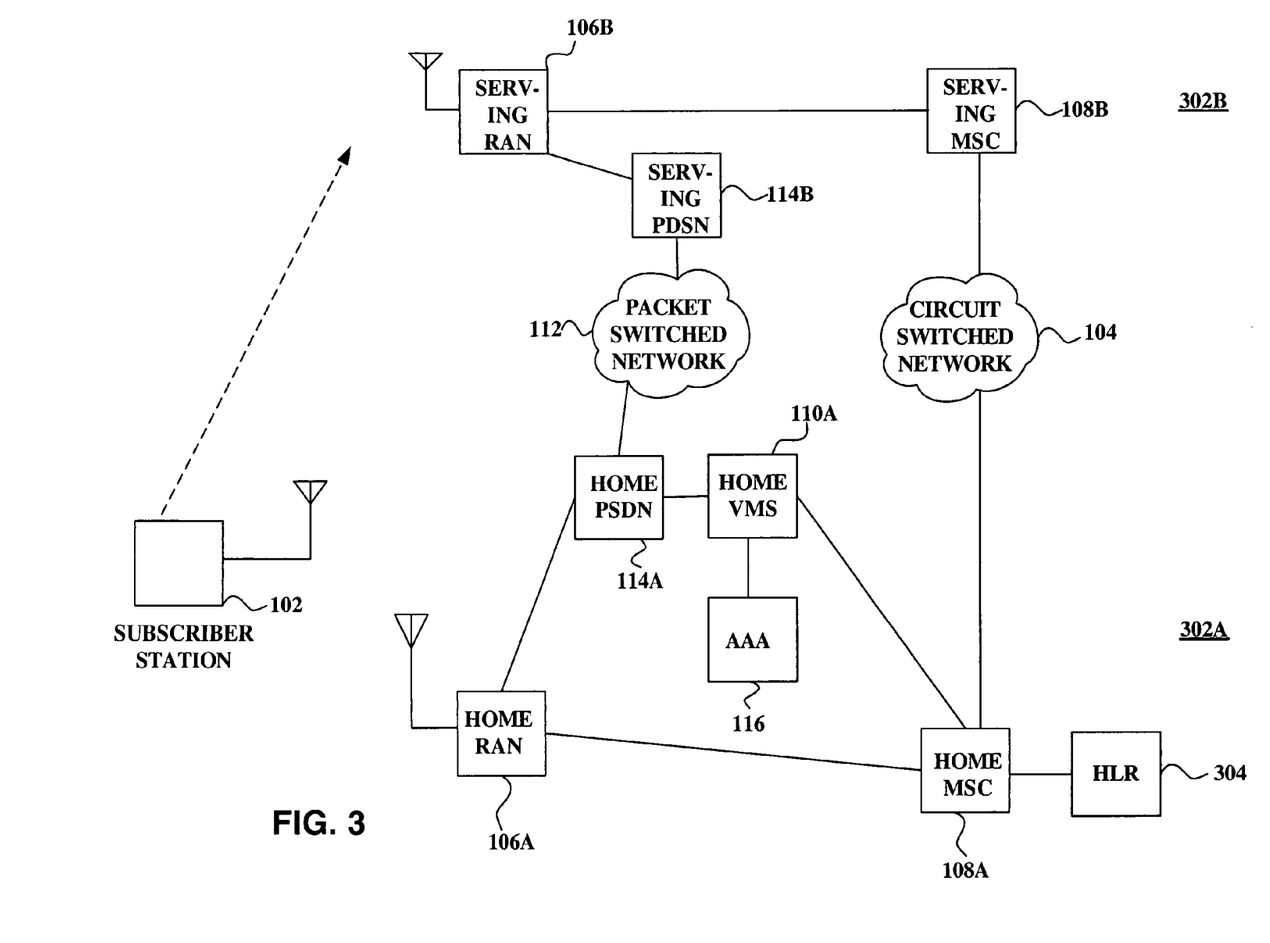
FIG. 3 is a conceptual block diagram illustrating an example of a wireless communications system comprising multiple networks.

The concept of circuit-switched call notification during packet data sessions with active network connections may be extended across network boundaries. FIG. 3 is a conceptual block diagram of an IS-95 wireless communications system configured to support voice and packet data services. The IS-95 wireless communications system is shown with a number of networks. The subscriber station 102 is shown moving through different networks by a series of broken lines. The subscriber station 102 is shown initially in its home network 302a, where it may access the circuit-switched and packet-switched networks by first registering within its home RAN 106a. The registration process includes the transmission of a system identification code (SID) from the home RAN 106 to the subscriber station 102 on a forward link overhead channel. When the subscriber station 102 receives the SID, it compares it to the SID programmed into the subscriber station 102. If the SIDs match, the subscriber station 102 knows that it is in communication with the RAN 106a from its home network 302a.

Once the subscriber station 102 receives the SID, it may transmit a registration request to the home RAN 106a. The registration request may be used to report the location of the subscriber station 102 within the home network 302a to the home MSC 108a. The home MSC 108a may store this information in a database. The database allows the MSC 108a to intelligently route calls to the subscriber station 102 without having to page the subscriber station 102 throughout the entire home network 302a.

As the subscriber station 102 moves out of its home network 302a and into a new serving network 302b, it will generally need to register with that network. During the registration process, the subscriber station 102 may receive a SID from the serving RAN 106b. However, unlike the registration process in the subscriber station's home network 302a, the SID from the serving RAN 106b will not match the SID programmed into the subscriber station 102. Because of the mismatch, the subscriber station 102 will recognize that it is outside its home network 302a and is roaming. The subscriber station 102 may then transmit a registration request to the serving MSC 108b through the serving RAN 106b. The registration request may include the SID programmed into the subscriber station 102. The SID provides an indication to a serving MSC 108b that the subscriber station 102 is roaming. The serving MSC 108b may use the SID to identify the home network 302a of the subscriber station 102. The serving MSC 108b may then contact the home MSC 108a to report the location of the subscriber station 102 and verify that the subscriber station 102 is authorized to operate within the serving network 302b. The location of the subscriber station 102 may then be recorded to a Home Location Register (HLR) 304 by the home MSC 108a. The HLR 304 may be used to track the subscriber station 102 as it moves through the different networks.

Once the subscriber station 102 is registered with the serving MSC 108b, it may access the packet-switched network 112 by first establishing an air link with the serving RAN 106b. A logical resource connection between the serving RAN 106b and a serving PDSN 114b may be established. A data link may then be set up between the subscriber station 102 and the serving PDSN 114 in accordance with a PPP link layer protocol. Next, the PPP link layer protocol may be used to negotiate an Internet Protocol (IP) address to assign to the subscriber station 102. Once an IP address is assigned, the subscriber station 102 may communicate with the packet-switched network 112 over a network connection.

In various embodiments of the communications system in which the subscriber station 102 does not rely on SMS messages for circuit-switched call notification, the subscriber station 102 may need to register with its home VMS 110a to receive such notifications. As indicated earlier, the subscriber station 102 may be pre-configured with the IP address for its home VMS 110a. Alternatively, the subscriber station 102 may be pre-configured with the FQDN for its home VMS 110a, which may be used to obtain the VMS's IP address. Either way, once the IP address for the home VMS 110a is known, the subscriber station 102 may deliver a registration request to its home VMS 110a using the existing packet data session between the subscriber station 102 and the serving PDSN 114a. In this case, the serving PDSN 114b acts as a router forwarding the registration request to the PDSN 114a in the subscriber station's home network. The home PDSN 114a may then deliver the registration request to the home VMS 110a.

The home VMS 110a may attempt to authenticate the registration request using an independent source, such as the AAA center 116 in the home network 302a. Assuming the AAA center 116 authenticates the subscriber station 102, the AAA center 116 may access internally stored user profile and QoS information to authorize registration. If the AAA center 116 authorizes registration, a registration acknowledgement may be routed back to the serving PDSN 114*b* and forwarded to the subscriber station 102 using the existing packet data session. A secure connection may be established between the subscriber station 102 and the home VMS 110*a* by using session keys, or any other encryption methodology. As part of the registration process, the subscriber station 102 and the home VMS 110*a* may establish a TCP session that allows reliable delivery of registration messages as well as subsequent communications.

An incoming circuit-switched call for the subscriber station 102 may be initially delivered to the MSC 108*a* in the subscriber station's home network. When the call is received, the home MSC 108*a* recognizes that the intended subscriber station 102 is not registered in its home network and consults the HLR 304 to determine the location of the subscriber station 102. The HLR 304 responds by sending a signal to the home MSC 108*a* indicating that the subscriber station 102 is in the serving network 302*b*. Once the home MSC 108*a* receives this information, it may reroute the incoming call to the MSC 108*b* in the serving network 302*b*.

The serving MSC 108*b* may be used to direct the appropriate BSC in the serving RAN 106*b* to page the subscriber station 102. A PCF integrated into the BSC may be used to determine whether the network connection is dormant. In the event that the network connection is active, a busy signal may be sent back to the serving MSC 108*b* indicating that the subscriber station 102 is unavailable to take the call.

In response to the busy signal, the serving MSC 108*b* may send a busy signal indication to the home MSC 108*a*. The home MSC 108*a* may forward the busy signal indication to the home VMS 110*a* along with the subscriber station's telephone number. The manner in which the home VMS 110*a* processes this information may depend on whether SMS messages are used to notify the subscriber station 102 of the incoming call or whether the notification is sent over the existing packet data session between the subscriber station 102 and the serving PDSN 114*b*.

In the case where SMS messages are used, the home VMS 110*a* may access an internal database (not shown) containing the SMS profile for the subscriber station 102. If the SMS profile indicates that circuit-switched calls are enabled for the subscriber station 102, the home VMS 110*a* may send a SMS message to the subscriber station 102 that contains a notification for the incoming call along with the caller identification information. The notification may be routed from the home VMS 110*a* to a MC (not shown) in the subscriber station's home network 302*a*. The MC may consult the HLR 304 to determine the location of the subscriber station 102 and route the SMS message to the MSC 108*b* serving that location. The serving MSC 108*b* may then deliver the SMS message to the subscriber station 102 through the serving RAN 106.

In the embodiment shown in FIG. 3, the notification message may be delivered to the subscriber station 102 over the packet data session in the serving network 302*a*. In this case, the home VMS 110*a* may use the subscriber station's telephone number to determine whether it is registered to receive circuit-switched calls during a packet data session with an active network connection. If the telephone number is not registered, then the home MSC 108*a* may reroute the call to the home VMS 110*a* to be handled in the conventional fashion. Conversely, if the telephone number is registered, the home VMS 110*a* may be used to encrypt a circuit-switched call notification message using the session key and deliver the encrypted notification message to the subscriber station 102 over the TCP session established during registration. The subscriber station's IP address may be appended to the notification message by the home VMS 110*b* so that it may be routed to the serving PDSN 114*b* and delivered to the subscriber station 102 over the existing packet data session.

A reply may be sent from the subscriber station 102 to the home VMS 110*a* in response to the voice call notification using SMS messages or packet data services. The reply generated by the subscriber station 102 may indicate whether the user accepts or rejects the incoming call. If the subscriber station 102 rejects the incoming call, then the home VMS 110*a* may handle the call in the usual manner in response to the reply. If, on the other hand, the user accepts the incoming call, the PPP session between the subscriber station 102 and the serving PDSN 114*a* may be released and a logical resource connection established between the serving RAN 106*b* and the serving MSC 108*b* to support the call. A call-delivery signal may be routed from the home VMS 110*a* through the home MSC 108*a* to the serving MSC 108*b*. In response to the call-delivery signal, the serving MSC 108*b* may page the subscriber station 102 triggering an exchange of signaling messages to support call set-up. Once the call is set up, the user on the subscriber station 102 may be able to communicate through the serving MSC 108*b* with the caller over the circuit-switched network 104.

Figure 4:
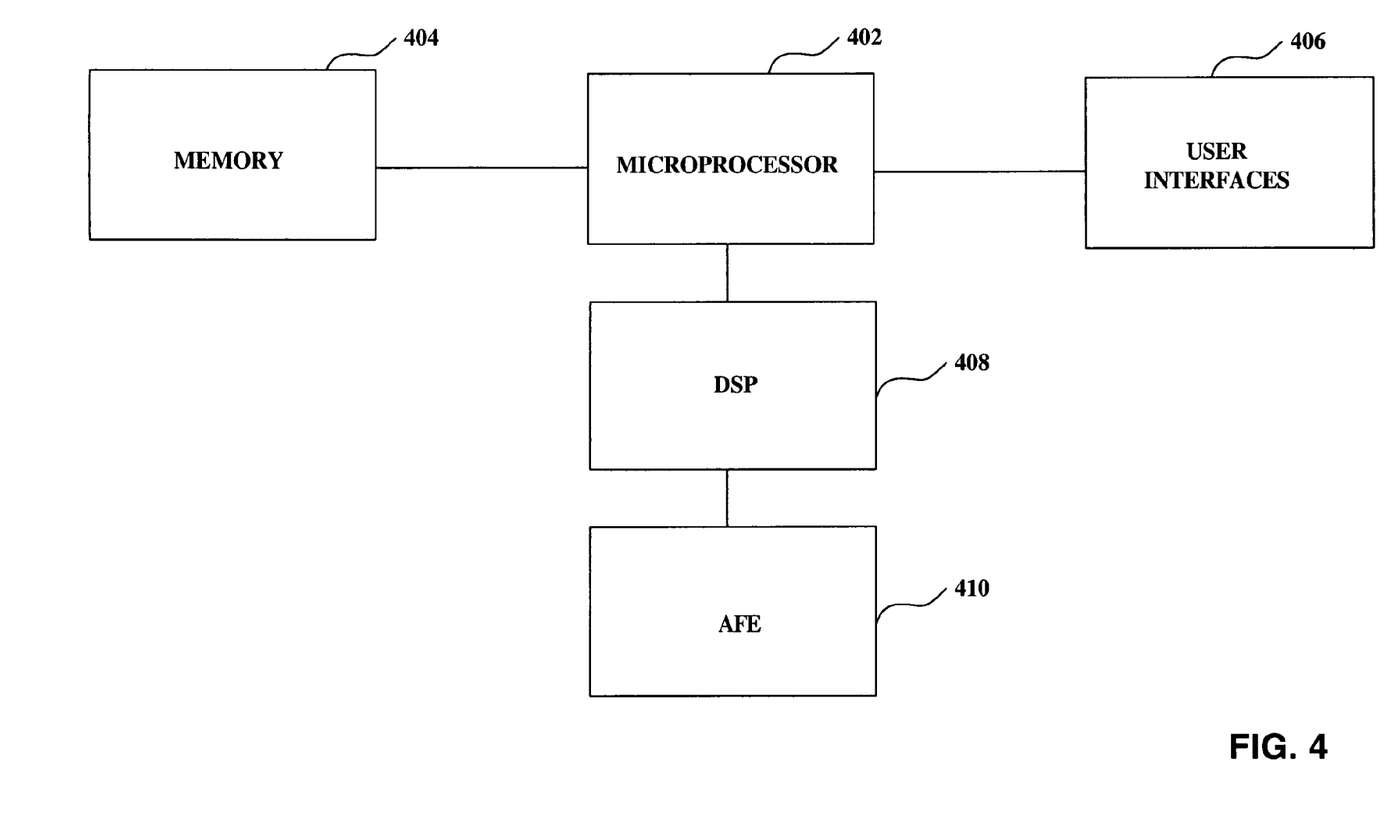
FIG. 4 is a conceptual block diagram illustrating an example of a hardware configuration for a software-based processor in a wireless communications device.

FIG. 4 is a conceptual block diagram illustrating one possible configuration of the subscriber station 102. As those skilled in the art will appreciate, the precise configuration of the subscriber station 102 may vary depending on the specific application and the overall design constraints. For the purposes of clarity and completeness, the various inventive concepts will be described in the context of a CDMA subscriber station, however, such inventive concepts are likewise suitable for use in various other communication devices. Accordingly, any reference to a CDMA subscriber station is intended only to illustrate the various aspects of the present invention, with the understanding that such aspects have a wide range of applications.

The subscriber station 102 may be implemented with a software based processor, or any other configuration known in the art. An example of the hardware configuration for a software based processor is shown in FIG. 4. The processor has a microprocessor 402 at its core with memory 404. The microprocessor 402 may provide a platform to run software programs that, among other things, manage access to the circuit-switched and packet-switched networks. In packet-switched applications, the microprocessor 402 may be responsible for creating, maintaining and terminating the packet data session with the appropriate PDSN.

The subscriber station 104 may also include various user interfaces 406 such as audio circuits, keypads, displays, ringers, vibrators, and the like. The user interfaces 406 are generally used to support voice and low rate data communications across a circuit-switched network. The user interfaces 406 may also be used to support a high speed connection to a packet-switched network, such as the case may be with an integrated web browser. In some embodiments, a local interface (not shown) may be provided to support a high speed connection between a remote network node and the packet-switched network.

A digital signal processor (DSP) 408 may be implemented with an embedded communications software layer which runs application specific algorithms to reduce the processing demands on the microprocessor 402. By way of example, during a packet data session with an active network connection, the DSP 408 may be used to encode and modulate data from the keypad (not shown), and to combine this data with various control channels before transmission through an analog front end (AFE) 410 over the reverse link. The DSP 408 may also be used to decode and demodulate forward link data received from the AFE 410 and extract the various control channels before presenting the data to the display (not shown). The software layer may also be used to interface the DSP hardware to the microprocessor 402 and may provide low level services such as allocation of resources to allow the higher level software programs to run.

When power is initially applied to the subscriber station, the microprocessor 402 may be used to monitor the control channels for a pilot signal from a RAN (not shown). Once the microprocessor 402 detects a pilot signal, it may acquire the necessary timing information and register with the RAN. The subscriber station 102 may then access the circuit-switched and packet-switched networks (not shown).

In at least one embodiment of the subscriber station 102, the microprocessor 402 may be configured to register with the VMS (not shown) in its home network to receive voice-switched calls once a packet data session has begun. Using dedicated control channels, the microprocessor 402 may negotiate a session key with the VMS and establish a TCP connection ensure reliable delivery of registration messages as well as subsequent communications to the VMS. The encryption functions may be performed by the microprocessor 402, or alternatively off-loaded to the DSP 408.

As explained in the preceding paragraphs, the DSP 408 may be used to extract the control channels from the forward link transmission and provide them to the microprocessor 402. The microprocessor 402 may be configured to monitor one or more control channels for a notification that an incoming circuit-switched call has arrived. The notification may be sent to the subscriber station 102 over the packet data session, or alternatively, using SMS messaging. The notification may include caller information identification, which may be provided to the display for presentation to the user. The user may then use the keypad to signal to the microprocessor 402 whether the call should be accepted or rejected. Alternatively, the microprocessor 402 may be configured to automatically accept the circuit-switched call. Either way, a reply may be generated by the microprocessor 402 and sent to the VMS. The reply may be encrypted by the microprocessor 402 or the DSP 408 and routed to the VMS over the TCP session. Alternatively, the reply may be sent back to the VMS using SMS messaging. If the microprocessor 402 accepts the call, either because it is configured to accept the call or in response to the keypad entries, the microprocessor 402 may then terminate the packet data session and exchange signals with the MSC to support call set up.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the subscriber station, or elsewhere. In the alternative, the processor and the storage medium may reside as discrete components in the subscriber station, or elsewhere in an access network.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless communications, comprising:
    establishing a packet data session from a wireless communications device to support a network connection to a packet-switched network;
    transmitting a registration request, from the wireless communications device, over the packet data session to a voice message server using a session key to enable the wireless communications device to receive a notification from the voice message server of an incoming call from a circuit-switched network, the registration request including connection information identifying the wireless communications device; and
    receiving the notification, in the wireless communications device identified by the connection information, from the voice message server while the packet data session is active.

2. The method of claim 1 wherein the registration comprises communication from the wireless communications device with the voice message server over a transport control protocol session.

3. The method of claim 1 further comprising terminating the packet data session in response to the notification of the incoming call, and accepting the incoming call from the circuit-switched network.

4. The method of claim 3 wherein the acceptance of the incoming call comprises establishing a connection with a mobile switching center to support the incoming call.

5. The method of claim 1 further comprising terminating the packet data session in response to the notification, and establishing a connection with a mobile switching center to support the incoming call.

6. The method of claim 1, wherein the connection information includes an IP address assigned to the wireless communications device.

7. A method of wireless communications, comprising:
    establishing a packet data session from a wireless communications device to support a network connection to a packet-switched network;
    transmitting a registration request, from the wireless communications device, over the packet data session to a voice message server using a session key to enable the wireless communications device to receive a notification from the voice message server of an incoming call from a circuit-switched network, the registration request including connection information identifying the wireless communications device;

receiving the notification, in the wireless communications device identified by the connection information, from the voice message server while the packet data session is active; and sending a reply from the wireless communications device to the voice message server in response to the notification.

8. The method of claim 7 wherein the reply is sent over the packet data session.

9. A wireless communications device, comprising:
a processor configured to establish a packet data session to support a network connection to a packet-switched network, transmit a registration request, from the wireless communications device, over the packet data session to a voice message server using a session key to enable the wireless communications device to receive a notification from the voice message server of an incoming call from a circuit-switched network, the registration request including connection information identifying the wireless communications device, and receive the notification, in the wireless communications device identified by the connection information, from the voice message server while the packet data session is active.

10. The wireless communications device of claim 9 wherein the processor is further configured to register with the voice message server over a transport control protocol session.

11. The wireless communications device of claim 9 wherein the processor is further configured to terminate the packet data session in response to the notification, and accept the incoming call from the circuit-switched network.

12. The wireless communications device of claim 11 wherein the processor is further configured to accept the incoming call by establishing a connection with a mobile switching center to support the incoming call.

13. The wireless communication device of claim 9, wherein the connection information includes an IP address assigned to the wireless communications device.

14. A wireless communications device, comprising:
a processor configured to establish a packet data session to support a network connection to a packet-switched network, transmit a registration request, from the wireless communications device, over the packet data session to a voice message server using a session key to enable the wireless communications device to receive a notification from the voice message server of an incoming call from a circuit-switched network, the registration request including connection information identifying the wireless communications device, and receive the notification, in the wireless communications device identified by the connection information, from the voice message server while the packet data session is active,
wherein the processor is further configured to send a reply to the voice message server in response to the notification.

15. The wireless communications device of claim 14 wherein the processor is further configured to send the reply over the packet data session.

16. The wireless communications device of claim 15 wherein the processor is further configured to terminate the packet data session in response to the notification, and establish a connection with a mobile switching center to support the incoming call.

17. A wireless communications device, comprising:
means for establishing a packet data session to support a network connection to a packet-switched network;
means for transmitting a registration request, from the wireless communications device, over the packet data session to a voice message server using a session key to enable the wireless communications device to receive a notification from the voice message server of an incoming call from a circuit-switched network, the registration request including connection information identifying the wireless communications device; and
means for receiving the notification, in the wireless communications device identified by the connection information, while the packet data session is active.

18. A method of wireless communications, comprising:
establishing a packet data session between a wireless communications device and a packet data serving node to support a network connection with a packet-switched network;
transmitting a registration request, from the wireless communications device, over the packet data session to a voice message server using a session key to enable the wireless communications device to receive a notification from the voice message server of an incoming call from a circuit-switched network, the registration request including connection information identifying the wireless communications device; and
routing the notification of an incoming circuit-switched call from the voice message server to the wireless communications device identified by the connection information while the packet data session is active.

19. The method of claim 18 wherein the notification is sent over the packet data session between the wireless communications device and the packet data serving node.

20. The method of claim 18 further comprising terminating the packet data session between the wireless communications device and the packet data serving node in response to the notification, and establishing a connection between the wireless communications device and a mobile switching center to support the incoming call.

21. The method of claim 18, wherein the connection information includes an IP address assigned to the wireless communications device.

22. A method of wireless communications, comprising:
establishing a packet data session between a wireless communications device and a packet data serving node to support a network connection with a packet-switched network;
transmitting a registration request, from the wireless communications device, over the packet data session to a voice message server using a session key to enable the wireless communications device to receive a notification from the voice message server of an incoming call from a circuit-switched network, the registration request including connection information identifying the wireless communications device;
routing the notification of an incoming circuit-switched call from the voice message server to the wireless communications device identified by the connection information while the packet data session is active;
receiving the incoming call at a mobile switching center while the network connection is active;
routing a signal from the mobile switching center to the voice message server indicating that the wireless communications device is unavailable, the receipt of the signal at the voice message server prompting the routing of the notification from the voice message server to the wireless communications device;

routing a reply from the wireless communications device to the voice message server; and signaling the mobile switching center from the voice message server to deliver the incoming call to the wireless communications device in response to the reply.

23. A method of communications, comprising:

operating a wireless communications device in a serving network, the wireless communications device being assigned to a home network different from the serving network;

establishing a packet data session between the wireless communications device and a packet data serving node in the serving network to support a network connection with a packet-switched network:

transmitting a registration request, from the wireless communications device, over the packet data session to a voice message server using a session key to enable the wireless communications device to receive a notification from the voice message server of an incoming call from a circuit-switched network, the registration request including connection information identifying the wireless communications device; and routing the notification of an incoming circuit-switched call from the voice message server in the home network to the wireless communications device identified by the connection information over the packet data session while the packet data session is active.

24. The method of claim 23 further comprising terminating the packet data session between the wireless communications device and the packet data serving node in the serving network in response to the notification, and establishing a connection between the wireless communications device and a mobile switching center in the serving network to support the incoming call.

25. A method of communications, comprising:

operating a wireless communications device in a serving network, the wireless communications device being assigned to a home network different from the serving network;

establishing a packet data session between the wireless communications device and a packet data serving node in the serving network to support a network connection with a packet-switched network:

transmitting a registration request, from the wireless communications device, over the packet data session to a voice message server using a session key to enable the wireless communications device to receive a notification from the voice message server of an incoming call from a circuit-switched network, the registration request including connection information identifying the wireless communications device;

routing the notification of an incoming circuit-switched call from the voice message server in the home network to the wireless communications device identified by the connection information over the packet data session while the packet data session is active;

receiving the incoming call at a mobile switching center in the home network while the packet data session is active;

routing a signal from the mobile switching center in the home network to the voice message server in the home network indicating that the wireless communications device is unavailable, the receipt of the signal at the voice message server in the home network prompting the routing of the notification of the incoming call from the voice message server in the home network to the wireless communications device;

routing a reply from the wireless communications device to the voice message server in the home network; and signaling the mobile switching center in the serving network from the voice message server in the serving network to deliver the incoming call to the wireless communications device in response to the reply.

26. A non-transitory storage medium having instructions thereon, the instructions comprising:

code for establishing a packet data session from a wireless communications device to support a network connection to a packet-switched network;

code for transmitting a registration request, from the wireless communications device, over the packet data session to a voice message server using a session key to register the wireless communications device to receive a notification of an incoming call from a circuit-switched network; and code for receiving the notification, in the wireless communications device identified by the connection information, from the voice message server while the packet data session is active.

27. A method of wireless communications, comprising:

establishing a packet data session between a wireless communications device and a packet data serving node to support a network connection with a packet-switched network;

routing a notification of an incoming circuit-switched call from a voice message server to the wireless communications device while the packet data session is active; and receiving the incoming call at a mobile switching center while the network connection is active, routing a signal from the mobile switching center to the voice message server indicating that the wireless communications device is unavailable, the receipt of the signal at the voice message server prompting the routing of the notification from the voice message server to the wireless communications device, the method further comprising routing a reply from the wireless communications device to the voice message server, and signaling the mobile switching center from the voice message server to deliver the incoming call to the wireless communications device in response to the reply.

28. A method of communications, comprising:

operating a wireless communications device in a serving network, the wireless communications device being assigned to a home network different from the serving network;

establishing a packet data session between the wireless communications device and a packet data serving node in the serving network to support a network connection with a packet-switched network;

routing a notification of an incoming circuit-switched call from a voice message server in the home network to the wireless communications device while the packet data session is active; and receiving the incoming call at a mobile switching center in the home network while the network connection is active, routing a signal from the mobile switching center in the home network to the voice message server in the home network indicating that the wireless communications device is unavailable, the receipt of the signal at the voice message server in the home network prompting the routing of the notification of the incoming call from the voice message server in the home network to the wireless communications device, the method further comprising routing a reply from the wireless communications device to the voice message server in the home network, and signaling the mobile switching center in the serving network from the voice message server in the serving network to deliver the incoming call to the wireless communications device in response to the reply.

* * * * *